United States Patent
Goto et al.

(10) Patent No.: US 11,464,607 B2
(45) Date of Patent: Oct. 11, 2022

(54) MODEL TEETH, MODEL TEETH BASE, AND DENTAL MODEL

(71) Applicant: NISSIN DENTAL PRODUCTS INC., Kyoto (JP)

(72) Inventors: Hideaki Goto, Kameoka (JP); Teruyuki Iwasaki, Kameoka (JP); Yuhei Matsuoka, Kameoka (JP)

(73) Assignee: NISSIN DENTAL PRODUCTS INC., Kyoto (JP)

( * ) Notice: Subject to any disclaimer, the term of this patent is extended or adjusted under 35 U.S.C. 154(b) by 390 days.

(21) Appl. No.: 16/473,231

(22) PCT Filed: Sep. 27, 2018

(86) PCT No.: PCT/JP2018/036025
§ 371 (c)(1),
(2) Date: Jun. 24, 2019

(87) PCT Pub. No.: WO2020/065848
PCT Pub. Date: Apr. 2, 2020

(65) Prior Publication Data
US 2021/0315671 A1    Oct. 14, 2021

(51) Int. Cl.
*A61C 9/00* (2006.01)
*A61C 13/34* (2006.01)
*G09B 23/28* (2006.01)

(52) U.S. Cl.
CPC ............ *A61C 9/002* (2013.01); *A61C 13/34* (2013.01); *G09B 23/283* (2013.01)

(58) Field of Classification Search
CPC ........... A61C 9/00; A61C 9/002; A61C 13/00; A61C 13/34; A61C 8/0001; A61C 8/006;
(Continued)

(56) References Cited

U.S. PATENT DOCUMENTS 3,153,283 A * 10/1964 Weissman .............. A61C 9/002
                                                   433/176
3,226,827 A *  1/1966 Spalten ................... A61C 9/002
                                                   433/28
(Continued)

FOREIGN PATENT DOCUMENTS

JP   H04-28675 U    3/1992
JP   2002-000628 A  1/2002
(Continued)

OTHER PUBLICATIONS

An Office Action issued by the Canadian Intellectual Property Office dated Apr. 29, 2020, which corresponds to Canadian Patent Application No. 3,040,240 and is related to U.S. Appl. No. 16/473,231.

*Primary Examiner* — Cris L. Rodriguez
*Assistant Examiner* — Courtney N Huynh
(74) *Attorney, Agent, or Firm* — Studebaker & Brackett PC (57) ABSTRACT

Model teeth 20 for a dental model includes a model teeth base 10 provided with a plurality of insertion holes 13 having an inner surface provided with an insertion hole-side step portion 13b such that a deep side of the holes 13 is narrower than an opening side, and a plurality of the teeth 20 having a tooth crown portion 21 exposed from the holes 13 and a tooth root portion 22 inserted inside the holes 13, when the model teeth are detachably inserted into the holes 13, respectively. The teeth 20 include a model teeth-side step portion 26 provided on an outer surface of the portion 22 and cause the teeth 20 to move in a direction such that a distance between adjacent teeth 20 is shortened, as the teeth 20 abut the portion 13b when inserted into the holes 13 and the teeth 20 are inserted deep into the holes 13.

3 Claims, 7 Drawing Sheets

(58) Field of Classification Search
CPC ........ A61C 8/005; G09B 23/00; G09B 23/28; G09B 23/283; G09B 23/30; G09B 23/34; G09B 19/0084
See application file for complete search history.

(56) References Cited

U.S. PATENT DOCUMENTS

| | | | | |
|---|---|---|---|---|
| 4,054,995 | A * | 10/1977 | Yoshida | A61C 9/002 433/74 |
| 4,238,189 | A * | 12/1980 | Tirino | A61C 9/002 264/16 |
| 4,242,812 | A * | 1/1981 | Randoll | G09B 23/283 433/74 |
| 4,443,192 | A * | 4/1984 | Blitz | A61C 9/002 433/74 |
| 4,521,188 | A * | 6/1985 | Metzler | A61C 9/002 433/74 |
| 5,222,891 | A * | 6/1993 | Poveromo | A61C 9/002 433/74 |
| 5,286,191 | A * | 2/1994 | Poveromo | A61C 9/002 433/74 |
| 6,524,105 | B2 | 2/2003 | Raffeiner | |
| 10,631,952 | B2 * | 4/2020 | Fisker | G16H 50/50 |
| 2001/0044092 | A1 | 11/2001 | Raffeiner | |
| 2005/0250069 | A1 * | 11/2005 | Pawlus | A61C 9/002 433/74 |
| 2008/0254422 | A1 | 10/2008 | Lee et al. | |
| 2011/0236849 | A1 * | 9/2011 | Pogorelsky | A61C 13/10 433/24 |
| 2016/0365008 | A1 | 12/2016 | Lee | |
| 2018/0040260 | A1 | 2/2018 | Lee | |

FOREIGN PATENT DOCUMENTS

| | | |
|---|---|---|
| JP | 2007-328083 A | 12/2007 |
| JP | 2017-009838 A | 1/2017 |
| WO | 2012/002487 A1 | 1/2012 |
| WO | 2012/002488 A1 | 1/2012 |

* cited by examiner

MODEL TEETH, MODEL TEETH BASE, AND DENTAL MODEL

TECHNICAL FIELD

The present invention relates to model teeth, a model teeth base, and a dental model.

BACKGROUND ART

In the related art, a dental model is used in the case of performing various practices in a dental educational institution (a dental university, a dental hygienist school, or a dental technician school) a dental clinic, a dental seminar, or the like. The dental model includes a plurality of model teeth and a model teeth base provided with insertion holes into which the model teeth are detachably insertable, respectively, in some cases. In the dental model, the model teeth are inserted into the insertion holes, respectively, and the model teeth and the model teeth base are fixed with screws from a back side of the model teeth base (see Patent Document 1).

Patent Document 1: Japanese Unexamined Patent Application, Publication No. 2007-328083

DISCLOSURE OF THE INVENTION

Problems to be Solved by the Invention

However, when the insertion hole of the model teeth base is formed to strictly match a size of a tooth root portion of the model teeth during manufacturing, there is a possibility that the tooth root portion of the model teeth cannot be inserted into the insertion hole due to a manufacturing error, and thus the hole of the model teeth base is formed to be slightly larger than the tooth root portion of the model teeth. Therefore, in a case where the dental model is put in the insertion holes and screwed, a gap is formed between the model teeth adjacent to each other, in some cases.

An object of the invention is to provide model teeth, a model teeth base, and a dental model, in which a gap is unlikely to be formed between adjacent model teeth in the dental model including a plurality of the model teeth and the model teeth base provided with insertion holes into which the model teeth are detachably insertable, respectively.

Means for Solving the Problems

According to an aspect of the invention, there is provided model teeth that are used in a dental model including a model teeth base that is provided with a plurality of insertion holes having an inner surface provided with an insertion hole-side step portion such that each of the insertion holes is narrower on a deep side than on an opening side, and a plurality of the model teeth that are detachable to the insertion holes, and each provided with a tooth crown portion which is exposed from each of the insertion holes and a tooth root portion that is inserted inside each of the insertion holes, when the model teeth are inserted into the insertion holes, respectively, the model teeth comprising: a model teeth-side step portion that is provided on an outer surface of the tooth root portion and causes the model teeth to move in a direction in which a distance between adjacent model teeth is shortened, as each of the model teeth abuts the model insertion hole-side step portion when being inserted into each of the insertion holes and each of the model teeth is inserted deep into each of the insertion holes.

In addition, according to another aspect of the invention, there is provided model teeth that are used in a dental model including a model teeth base that is provided with a plurality of insertion holes having an inner surface provided with an insertion hole-side step portion such that each of the insertion holes is narrower on a deep side than on an opening side, and a plurality of the model teeth that are detachable to the insertion holes, and each provided with a tooth crown portion which is exposed from each of the insertion holes and a tooth root portion that is inserted inside each of the insertion holes, when the model teeth are inserted into the insertion holes, respectively, the model teeth comprising: a model teeth-side step portion that is provided on an outer surface of the tooth root portion and is inclined with respect to an insertion direction of the model teeth into the insertion hole so as to have a smaller cross section on a distal end side than a cross section on a side of the tooth crown portion.

It is preferable that the model teeth-side step portion has an inclined surface from an outer side of the dental model toward an inner side thereof.

It is preferable that the model teeth-side step portion has an inclined surface from a back tooth side of the dental model toward a front tooth side thereof.

Further, according to still another aspect of the invention, there is provided a model teeth base that is used in a dental model including a plurality of insertion holes, and a plurality of model teeth that are detachable to the insertion holes, and each provided with a tooth crown portion which is exposed from each of the insertion holes and a tooth root portion that is inserted inside each of the insertion holes, when the model teeth are inserted into the insertion holes, respectively, each of the model teeth being provided with a model teeth-side step portion that is provided on an outer surface of the tooth root portion and has a cross section on a distal end side, which decreases in size, the model teeth base comprising: an insertion hole-side step portion that is provided on an inner surface of each of the insertion holes so as to be narrower on a deep side of each of the insertion holes than on an opening side thereof and causes the model teeth to move in a direction in which a distance between adjacent model teeth is shortened, as each of the model teeth abuts the model teeth-side step portion when being inserted into each of the insertion holes and each of the model teeth is inserted deep into each of the insertion holes.

In addition, according to still another aspect of the invention, there is provided a model teeth base that is used in a dental model including a plurality of insertion holes, and a plurality of model teeth that are detachable to the insertion holes, and each provided with a tooth crown portion which is exposed from each of the insertion holes and a tooth root portion that is inserted inside each of the insertion holes, when the model teeth are inserted into the insertion holes, respectively, each of the model teeth being provided with a model teeth-side step portion that is provided on an outer surface of the tooth root portion and has a cross section on a distal end side, which decreases in size, the model teeth base comprising: an insertion hole-side step portion that is provided on an inner surface of each of the insertion holes so as to be narrower on a deep side of each of the insertion holes than on an opening side thereof and is inclined with respect to an insertion direction of the model teeth into the insertion holes.

It is preferable that the model teeth-side step portion has an inclined surface from an outer side of the dental model toward an inner side thereof.

It is preferable that the model teeth-side step portion has an inclined surface from a back tooth side of the dental model toward a front tooth side thereof.

In addition, according to the invention, there is provided a dental model including: the model teeth described above; and the model teeth base described above.

Effects of the Invention

According to the invention, it is possible to provide model teeth, a model teeth base, and a dental model, in which a gap is unlikely to be formed between adjacent model teeth in the dental model including a plurality of the model teeth and the model teeth base provided with insertion holes into which the model teeth are detachably insertable, respectively.

PREFERRED MODE FOR CARRYING OUT THE INVENTION

Figure 1:
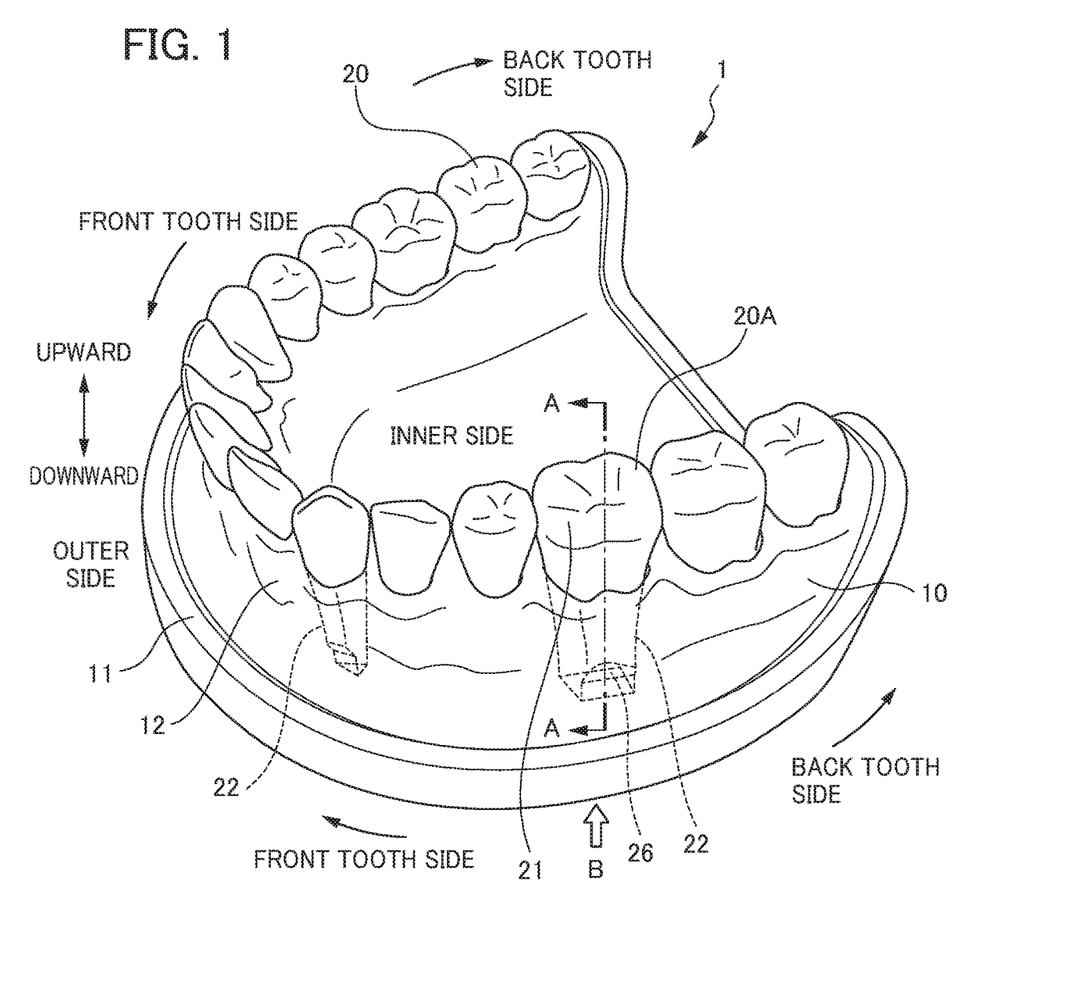
FIG. 1 is an overall perspective view illustrating a dental model 1 of the invention.

Hereinafter, an embodiment of the invention will be described with reference to the drawings. FIG. 1 is an overall perspective view illustrating a dental model 1 of the invention. The dental model 1 includes a model teeth base 10 and a plurality of model teeth 20 which are attached to the model teeth base 10. The model teeth base 10 and the model teeth 20 are each formed of a hard synthetic resin material by injection molding.

Figure 2:
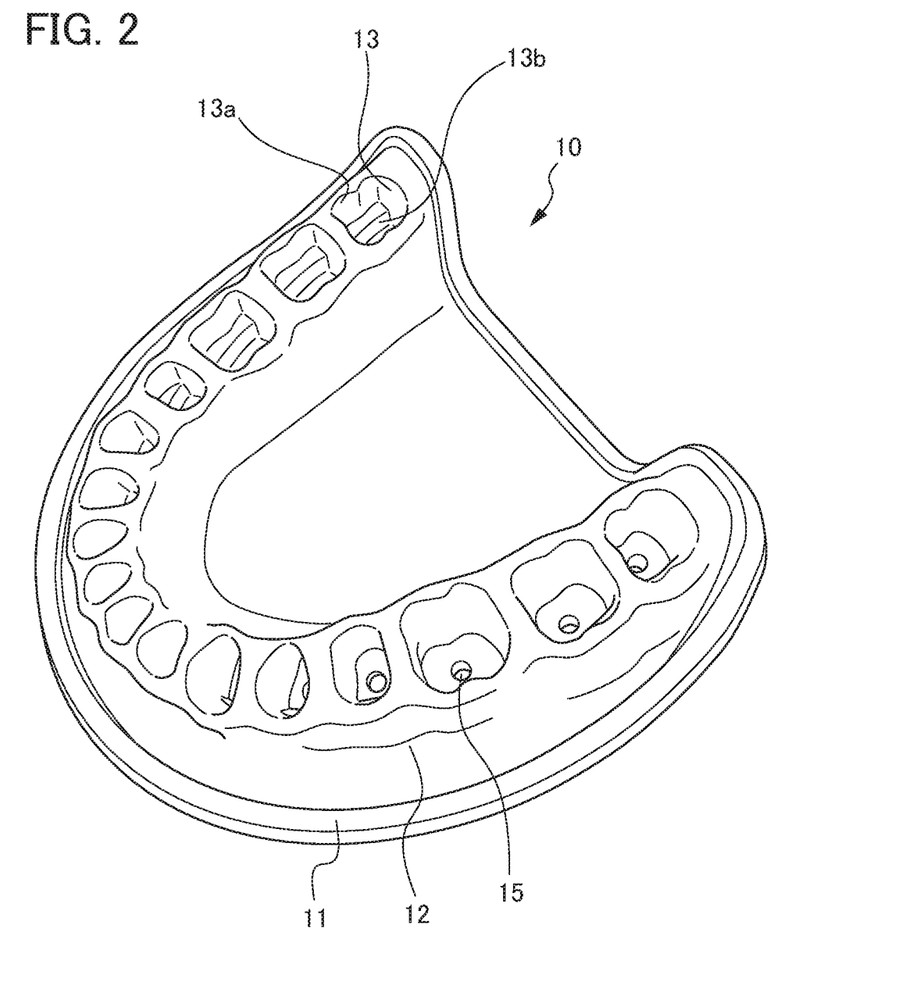
FIG. 2 is a perspective view of a model teeth base 10 in a state in which model teeth 20 are detached from the dental model 1.
Figure 3:
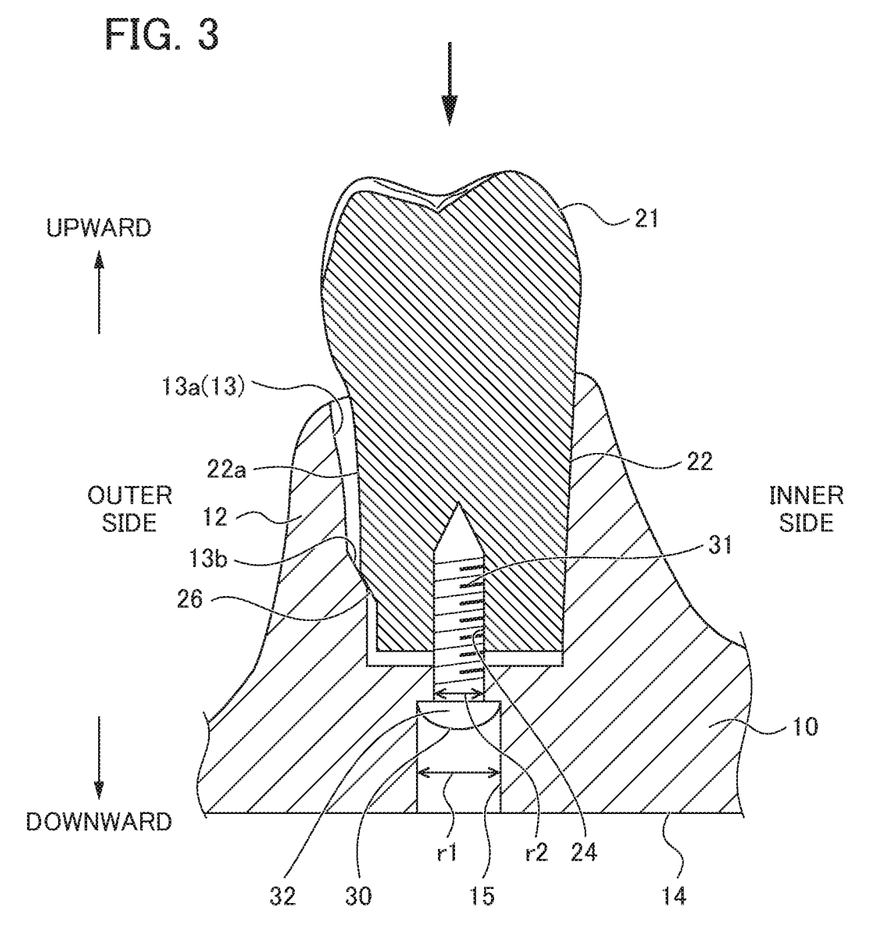
FIG. 3 is a cross-sectional view taken along line A-A of the dental model 1 illustrated in FIG. 1.
Figure 4:
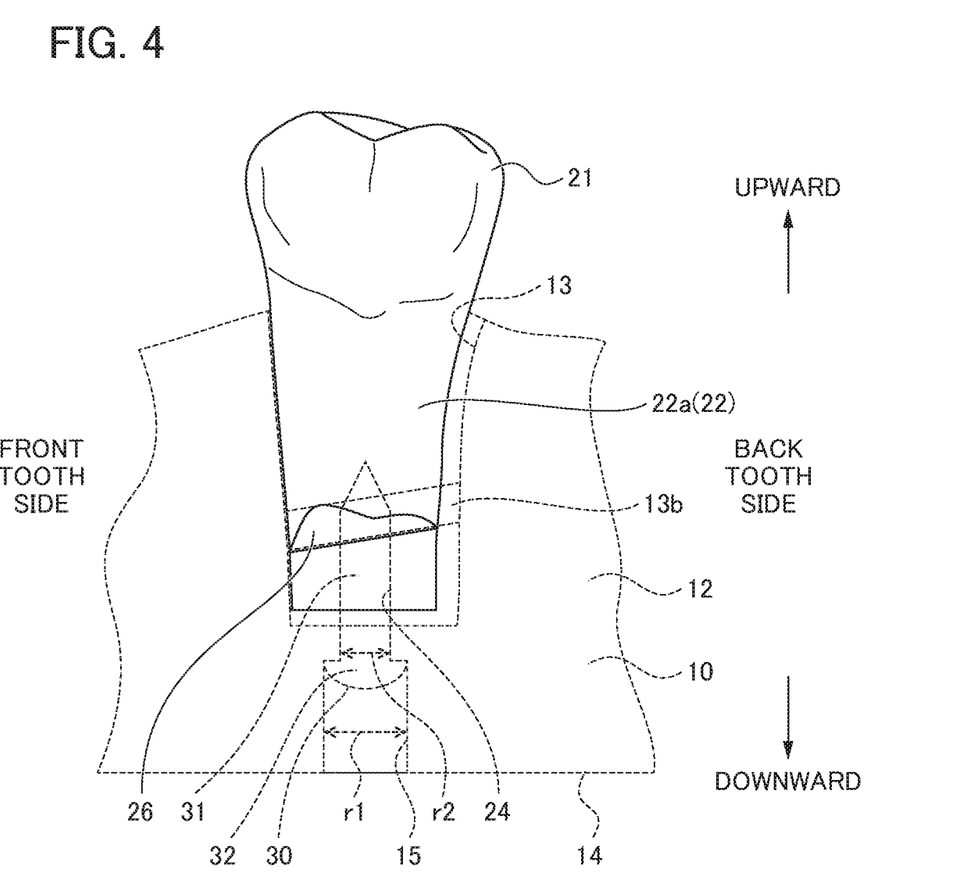
FIG. 4 is a front view illustrating model teeth 20A in a state of being viewed from a direction of an arrow B in FIG. 1, in which a model teeth base 10 is represented by a dotted line.

FIG. 2 is a perspective view of the model teeth base 10 in a state in which the model teeth 20 are detached from the dental model 1. FIG. 3 is a cross-sectional view taken along line A-A of the dental model 1 illustrated in FIG. 1. FIG. 4 is a front view illustrating the model teeth 20 (20A) in a state of being viewed from a direction of an arrow B in FIG. 1, in which the model teeth base 10 is represented by a dotted line.

(Model Teeth Base 10)

The model teeth base 10 includes a base pedestal 11 that is provided with a flat bottom surface 14, so as to be capable of performing mounting on a base, and a gingiva portion 12 projecting from the base pedestal 11 into a mountain shape.

The gingiva portion 12 has a top portion of a part projecting into a mountain shape, the top portion being provided with a plurality of insertion holes 13 into which the plurality of model teeth 20 are insertable, respectively.

In addition, a plurality of screw holes 15, into each of which a screw 30 to be described below is inserted, are provided from the bottom surface 14 of the model teeth base 10 toward the insertion holes 13, respectively. The screw hole 15 has a first diameter r1 on a side of the bottom surface 14, which allows a screw head portion 32 of the screw 30 to be inserted; however, the screw hole 15 has a second diameter r2 on a side of the insertion hole 13, which does not allow the screw head portion 32 to be inserted but allow a screw shaft portion 31 to be inserted, and the second diameter r2 is smaller than the first diameter r1.

(Model Teeth 20)

Each of the model teeth 20 includes a tooth crown portion 21, a tooth root portion 22, and a screw hole portion 24. The tooth crown portion 21 is a part that is exposed from the gingiva portion 12 in a state in which the model teeth 20 are fixed to the model teeth base 10. The tooth root portion 22 is a part that is inserted inside the insertion hole 13 so as to be covered with the gingiva portion 12 in a state in which the model teeth 20 are fixed to the model teeth base 10. The screw hole portion 24 extends from an end surface of the tooth root portion 22 toward a side of the tooth crown portion 21, and an inner surface of the screw hole portion 24 is provided with a screw groove.

The screw 30 has the screw shaft portion 31 and the screw head portion 32. A circumferential surface of the screw shaft portion 31 is provided with a screw thread that is screwed to the screw groove of the screw hole portion 24. The screw shaft portion 31 is inserted into the screw hole 15 from the side of the bottom surface 14 of the base pedestal 11 and is inserted into the screw hole portion 24 of the model teeth 20. In this manner, the screw groove of the screw 30 is screwed to the screw groove of the screw hole portion 24, and thereby the model teeth 20 are fixed to the model teeth base 10.

Hereinafter, as illustrated in FIG. 1, a tongue side on which a tongue is present in a case where the dental model is an actual mouth is defined as an inner side, and a cheek side and a lip side, which is an opposite side of the inner side is defined as an outer side. In addition, a back tooth side and a front tooth side are defined as illustrated in the drawings. Further, regardless or an upper tooth or a lower tooth, a side of the base pedestal 11 is defined as a lower side, and a side of the model teeth 20 is defined as an upper side as illustrated in the drawings.

As illustrated in a dotted line in FIG. 1, the model teeth 20 are provided with the tooth root portion 22 having a substantially rectangular cross section in the case of a molar on the back tooth side, and a canine tooth, a lateral incisor, and a central incisor on the front tooth side are each provided with the tooth root portion 22 having a substantially triangular cross section. In this manner, the cross section is not limited to the substantially rectangular shape or the substantially triangular shape, and, in all of the model teeth 20, one outer surface 22a of the outer surfaces of the tooth root portion 22 faces the outer side. A lower portion of the outer side surface 22a facing the outer side is provided with a model teeth-side step portion 26.

(Model Teeth-Side Step Portion 26)

As illustrated in FIG. 3, the tooth root portion 22 is provided with the model teeth-side step portion 26, and thereby a cross section of the tooth root portion on a lower side (distal end side) from the model teeth-side step portion 26 is smaller than a cross section thereof on an upper side (tooth crown portion side) from the model teeth-side step portion 26. In other words, the tooth root, portion 22 is thinner on the lower side than the upper side from the model teeth-side step portion 26.

In addition, a surface provided with the model teeth-side step portion 26 is not a surface that is orthogonal to an insertion direction (up-down direction) toward the insertion hole 13 of the model teeth base 10, that is, a surface that is parallel to the bottom surface 14 of the model teeth base 10, but is an inclined surface inclined with respect to the insertion direction, that is, an inclined surface inclined with respect to the bottom surface 14 of the model teeth base 10.

The inclined surface of the model teeth-side step portion 26 is inclined in two directions.

As illustrated in FIG. 3, one direction thereof is a direction from the upper side toward the lower side and from the outer side toward the inner side.

As illustrated in FIG. 4, the other direction thereof is a direction from the upper side toward the lower side and from the back tooth side toward the front tooth side.

(Insertion Hole 13 of Model Teeth Base 10)

Shapes of the insertion holes 13 provided in the model teeth base 10 correspond to shapes of the tooth root portions 22 of the model teeth 20, respectively. In other words, the insertion hole 13, into which the molar on the back tooth side is inserted, has a substantially rectangular cross section, and the insertion hole 13, into which each of the canine tooth, the lateral incisor, and the central incisor on the front tooth side is inserted, has a substantially triangular cross section.

However, when the insertion hole 13 of the model teeth base 10 strictly is formed to strictly match a size of the tooth root portion 22 of the model teeth 20, there is a possibility that the tooth root portion 22 of the model teeth 20 cannot be inserted into the insertion hole 13 of the model teeth base 10 due to a manufacturing error. Therefore, the insertion hole 13 of the model teeth base 10 is formed to be slightly larger than the tooth root portion 22 of the model teeth 20.

(Insertion Hole-Side Step Portion 13b)

In addition, one inner surface 13a of the inner surfaces of the insertion hole 13 is a surface on the outer side when viewed from the center portion of the insertion hole 13 and is provided to be substantially parallel to a tooth row, and a lower portion of the inner surface 13a is provided with an insertion hole-side step portion 13b.

As illustrated in FIG. 3, the insertion hole-side step portion 13b is provided to correspond to the model teeth-side step portion 26. In other words, the insertion hole 13 is provided with the insertion hole-side step portion 13b, and thereby a cross section of the insertion hole on a lower side (a deep side or a bottom side) from the insertion hole-side step portion 13b is smaller than a cross section thereof on an upper side (opening side) from the insertion hole-side step portion 13b. In other words, the insertion hole 13 is narrower on the lower side than the upper side from the insertion hole-side step portion 13b.

In addition, a surface provided with the insertion hole-side step portion 13b is not a surface that is orthogonal to the insertion direction (up-down direction) of the model teeth 20 into the insertion hole 13 of the model teeth base 10, that is, a surface that is parallel to the bottom surface 14 of the model teeth base 10, but is an inclined surface with respect to the insertion direction, that is, an inclined surface inclined with respect to the bottom surface 14 of the model teeth base 10.

The inclined surface of the insertion hole-side step portion 13b is inclined in two directions.

As illustrated in FIG. 3, one direction thereof is a direction from the upper side toward the lower side and from the outer side toward the inner side.

As illustrated in FIG. 4, the other direction thereof is a direction from the upper side toward the lower side and from the back tooth side toward the front tooth side.

Next, a method of attaching the model teeth 20 to the model teeth base 10 will be described.

Figure 5A:
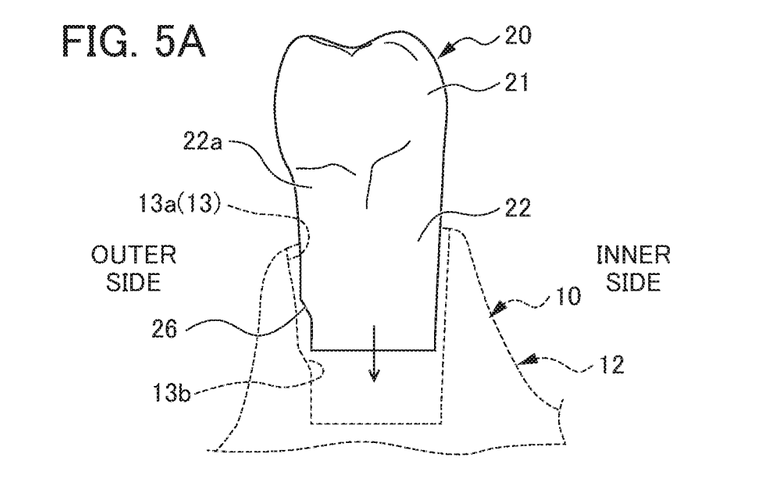
FIG. 5A is a view describing a moving state of the model teeth 20 when the model teeth 20 are inserted into the model teeth base 10.
Figure 5B:
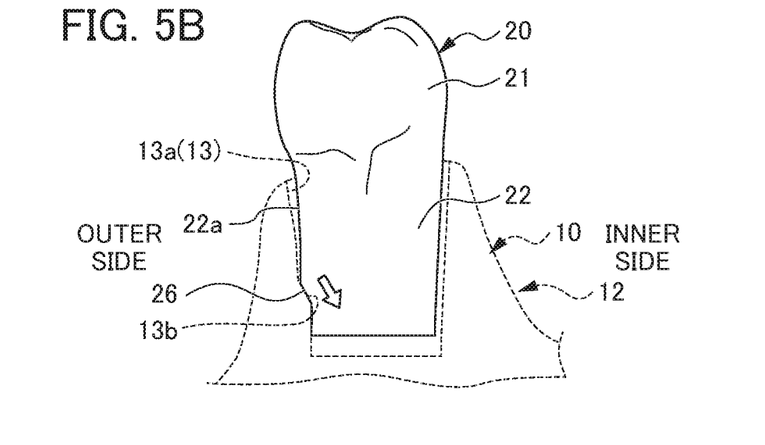
FIG. 5B is a view describing a moving state of the model teeth 20 when the model teeth 20 are inserted into the model teeth base 10.
Figure 5C:
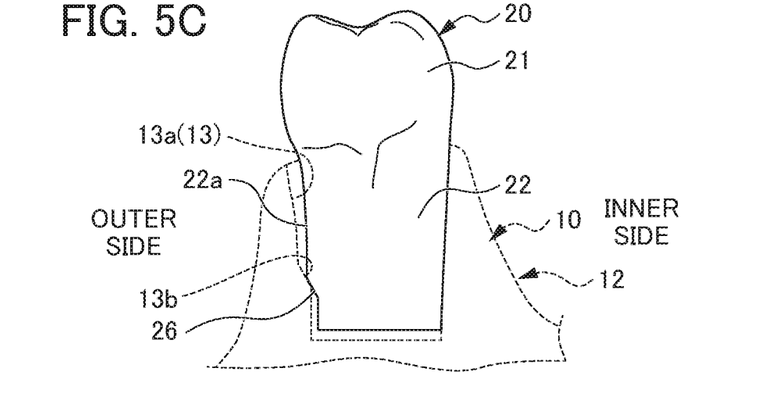
FIG. 5C is a view describing a moving state of the model teeth 20 when the model teeth 20 are inserted into the model teeth base 10.
Figure 6A:
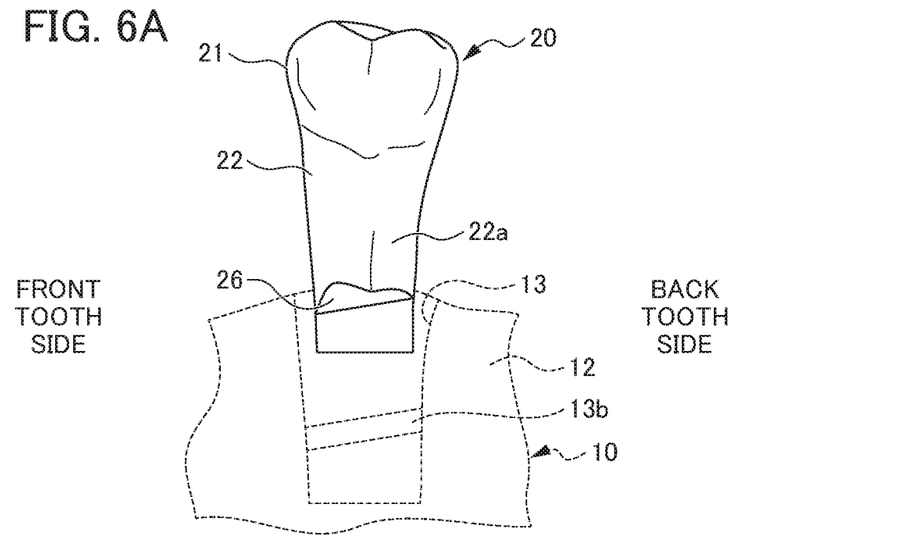
FIG. 6A is a view describing a moving state of the model teeth 20 when the model teeth 20 are inserted into the model teeth base 10.
Figure 6B:
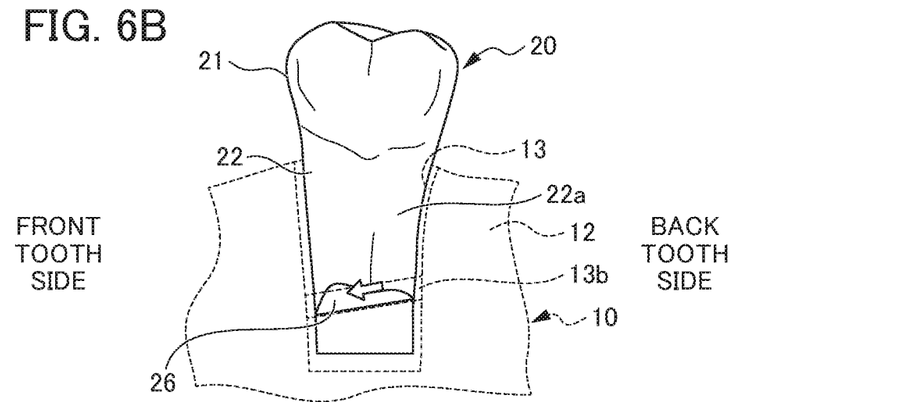
FIG. 6B is a view describing a moving state of the model teeth 20 when the model teeth 20 are inserted into the model teeth base 10.
Figure 6C:
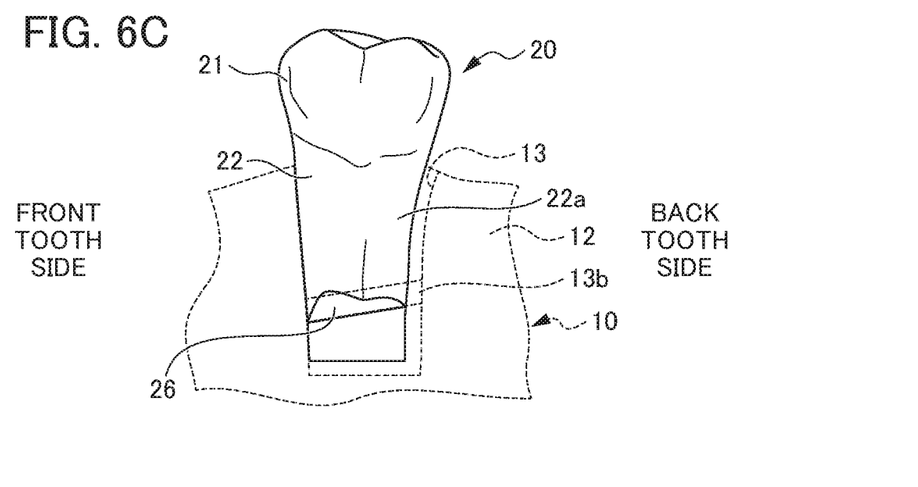
FIG. 6C is a view describing a moving state of the model teeth 20 when the model teeth 20 are inserted into the model teeth base 10.

FIGS. 5 and 6 are views illustrating a moving state of the model teeth 20 when the model teeth 20 are inserted into the model teeth base 10.

First, as illustrated in FIGS. 5A and 6A, the model teeth 20 are inserted downward in the insertion direction from the upper side toward the lower side of the insertion hole 13 of the model teeth base 10.

Then, as illustrated in FIGS. 5B and 6B, the model teeth-side step portion 26 abuts the insertion hole-side step portion 13b.

In this state, when the model teeth 20 further move downward, the model teeth-side step portion 26 slides obliquely downward on the inner side from the outer side along the insertion hole-side step portion 13b, as illustrated by an arrow in FIG. 5B, and the model teeth 20 come into a state in FIG. 5C of moving obliquely downward on the inner side.

In addition, the model teeth-side step portion 26 slides obliquely downward on the from, tooth side from the back tooth side along the insertion hole-side step portion 13b, as illustrated by an arrow in FIG. 6B, and the model teeth 20 come into a state in FIG. 6C of moving obliquely downward on the inner side.

Figure 7:
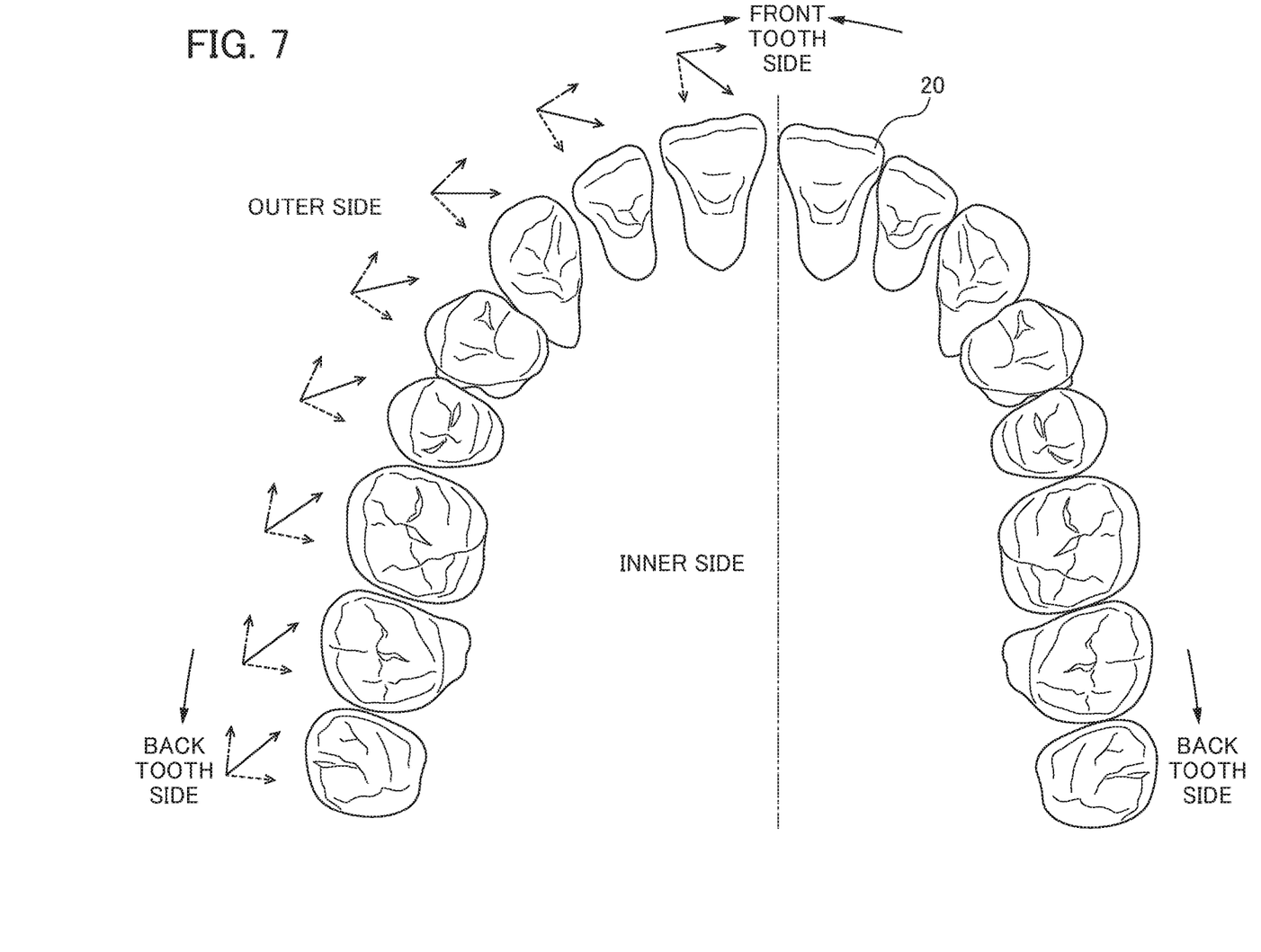
FIG. 7 is a view illustrating a movement direction of all of the model teeth 20.

FIG. 7 is a view illustrating a movement direction of all of the model teeth 20, a left view illustrates a state before the model teeth 20 illustrated in FIGS. 5A, 5B, 6A, and 6B move in a horizontal direction, and a right view illustrates a state after the model teeth 20 illustrated in FIGS. 5C and 6C move in the horizontal direction.

As illustrated in the left view, each of the model teeth 20 moves in a solid line direction obtained by combining an inner side direction represented by a dotted line and a front tooth side direction represented by a dot-and-dash line, that is a direction in which a distance between the model teeth is shortened. Hence, as illustrated in the right view of FIG. 7, a tooth row approximates to an actual tooth row, and a dental model in a state in which there is no gap between the model teeth 20 is obtained. In this state, each of the model teeth 20 is fixed with the screw 30.

Hereinafter, according to the embodiment, the inclined surface of the model teeth-side step portion 26 is inclined in two directions. As illustrated in FIG. 3, one direction thereof is a direction from the upper side toward the lower side and from the outer side toward the inner side. As illustrated in FIG. 4, the other direction thereof is a direction from the upper side toward the lower side and from the back tooth side toward the front tooth side.

In addition, the inclined surface of the insertion hole-side step portion 13b is inclined in two directions. As illustrated in FIG. 3, one direction thereof is a direction from the upper side toward the lower side and from the outer side toward the inner side. As illustrated in FIG. 4, the other direction thereof is a direction from the upper side toward the lower side and from the back tooth side toward the front tooth side.

Hence, when the model teeth 20 are inserted downward in the insertion direction from the upper side toward the lower side of the insertion hole 13 of the model teeth base 10, the model teeth-side step portion 26 abuts the insertion hole-side step portion 13b.

In this state, when the model teeth 20 further move downward, the model teeth-side step portion 26 slides obliquely downward on the inner side from the outer side along the insertion hole-side step portion 13b and the model teeth 20 come into a state of moving obliquely downward on the inner side. In addition, the model teeth-side step portion 26 slides obliquely downward on the front tooth side from the back tooth side along the insertion hole-side step portion 13b, and the model teeth 20 come into a state of moving obliquely downward on the front tooth side. In other words, each of the model teeth 20 moves in a direction in which a distance between the model teeth is shortened.

Hence, it is possible to provide the model teeth 20, the model teeth base 10, and the dental model 1, in which a gap is unlikely to be formed between adjacent model teeth 20 in the dental model in a state in which the tooth row approximates the actual tooth row.

EXPLANATION OF REFERENCE NUMERALS

1 DENTAL MODEL
10 MODEL TEETH BASE
11 BASE PEDESTAL
12 GINGIVA PORTION
13 INSERTION HOLE
13a INNER SURFACE
13b INSERTION HOLE-SIDE STEP PORTION
14 BOTTOM SURFACE
15 SCREW HOLE
20 MODEL TEETH
20A MODEL TEETH
21 TOOTH CROWN PORTION
22 TOOTH ROOT PORTION
22a OUTER SURFACE
24 SCREW HOLE PORTION
26 MODEL TEETH-SIDE STEP PORTION
30 SCREW
31 SCREW SHAFT PORTION
32 SCREW HEAD PORTION

The invention claimed is:

1. Model teeth configured to be detachably inserted into a model teeth base, the model teeth base being provided with a plurality of insertion holes having an inner surface provided with an insertion hole-side step portion such that each of the insertion holes is narrower on a deep side than on an opening side, the model teeth being detachably insertable into the insertion holes, each model tooth being provided with a tooth crown portion which is exposed from each of the insertion holes and a tooth root portion that is inserted inside each of the insertion holes, when the model teeth are inserted into the insertion holes, respectively, the model teeth comprising:
a model teeth-side step portion that is provided only on an outer surface of the tooth root portion on a buccal side opposite to a lingual side where a tongue is present in a case of being located in an actual mouth, and causes the model teeth to slide obliquely relative to a direction of insertion into the insertion holes such that a distance between adjacent model teeth is shortened, as each of the model teeth abuts the insertion hole-side step portion when being inserted into each of the insertion holes and each of the model teeth is inserted deep into each of the insertion holes, wherein the model teeth-side step portion includes an inclined surface which is inclined in two directions with respect to an insertion direction of the model teeth into the insertion holes, when a direction in which the model teeth are inserted into the insertion holes is defined as a direction from an upper side to a lower side, one direction of the two directions is defined as a direction in which the buccal side corresponds to the upper side and the lingual side corresponds to the lower side when the model teeth are inserted into the model teeth base, and one other direction of the two directions is defined as a direction in which a posterior tooth side corresponds to the upper side and an anterior tooth side corresponds to the lower side when the model teeth are inserted into the model teeth base.

2. A model teeth base including a plurality of insertion holes configured to detachably receive a plurality of model teeth, each model tooth being provided with a tooth crown portion which is exposed from each of the insertion holes and a tooth root portion that is inserted inside each of the insertion holes, when the model teeth are inserted into the insertion holes, respectively, each of the model teeth being provided with a model teeth-side step portion that is provided on an outer surface of the tooth root portion and has a cross section on a distal end side, which decreases in size, the model teeth base comprising:
an insertion hole-side step portion that causes the model teeth to slide obliquely relative to a direction of insertion into the insertion holes such that a distance between adjacent model teeth is shortened, as each of the model teeth abuts the insertion hole-side step portion when being inserted into each of the insertion holes and each of the model teeth is inserted deep into each of the insertion holes, the insertion hole-side step portion being provided on an inner surface of each of the insertion holes, and only on an outer a buccal side opposite to an inner a lingual side where a tongue is present in a case of being located in an actual mouth, the insertion hole-side step portion includes an inclined surface which is inclined in two directions with respect to an insertion direction of the model teeth into the insertion holes, when a direction in which the model teeth are inserted into the insertion holes is defined as a direction from an upper side to a lower side, one direction of the two directions is defined as a direction in which the buccal side corresponds to the upper side and the lingual side corresponds to the lower side, and one other direction of the two directions is defined as a direction in which a posterior tooth side corresponds to the upper side and an anterior tooth side corresponds to the lower side.

3. A dental model including a model teeth base that is provided with a plurality of insertion holes having an inner surface provided with an insertion hole-side step portion such that each of the insertion holes is narrower on a deep side than on an opening side, and a plurality of the model teeth that are detachable to the insertion holes, each provided with a tooth crown portion which is exposed from each of the insertion holes and a tooth root portion that is inserted inside each of the insertion holes, when the model teeth are inserted into the insertion holes, respectively, the model teeth comprising:

a model teeth-side step portion that is provided only on an outer surface of the tooth root portion on a buccal side opposite to a lingual side where a tongue is present in a case of being located in an actual mouth, and causes the model teeth to slide obliquely relative to a direction of insertion into the insertion holes such that a distance between adjacent model teeth is shortened, as each of the model teeth abuts the insertion hole-side step portion when being inserted into each of the insertion holes and each of the model teeth is inserted deep into each of the insertion holes, the model teeth-side step portion includes an inclined surface which is inclined in two directions with respect to an insertion direction of the model teeth into the insertion holes, when a direction in which the model teeth are inserted into the insertion holes is defined as a direction from an upper side to a lower side, one direction of the two directions is defined as a direction in which the buccal side corresponds to the upper side and the lingual side corresponds to the lower side when the model teeth are inserted into the model teeth base, and one other direction of the two directions is defined as a direction in which a posterior tooth side corresponds to the upper side and an anterior tooth side corresponds to the lower side when the model teeth are inserted into the model teeth base, and the model teeth base comprising:

an insertion hole-side step portion that causes the model teeth to slide obliquely relative to a direction of insertion into the insertion holes such that a distance between adjacent model teeth is shortened, as each of the model teeth abuts the insertion hole-side step portion when being inserted into each of the insertion holes and each of the model teeth is inserted deep into each of the insertion holes, the insertion hole-side step portion being provided on an inner surface of each of the insertion holes only on a buccal side opposite to a lingual side where a tongue is present in a case of being located in an actual mouth, the insertion hole-side step portion includes an inclined surface which is inclined in two directions with respect to an insertion direction of the model teeth into the insertion holes, when a direction in which the model teeth are inserted into the insertion holes is defined as a direction from an upper side to a lower side, one direction of the two directions is defined as a direction in which the buccal side corresponds to the upper side and the lingual side corresponds to the lower side, and one other direction of the two directions is defined as a direction in which a posterior tooth side corresponds to the upper side and an anterior tooth side corresponds to the lower side.

\* \* \* \* \*